Sept. 18, 1962
L. J. FRITSCHEN
3,054,841
SHIELDED NET RADIOMETER
Filed Nov. 2, 1959
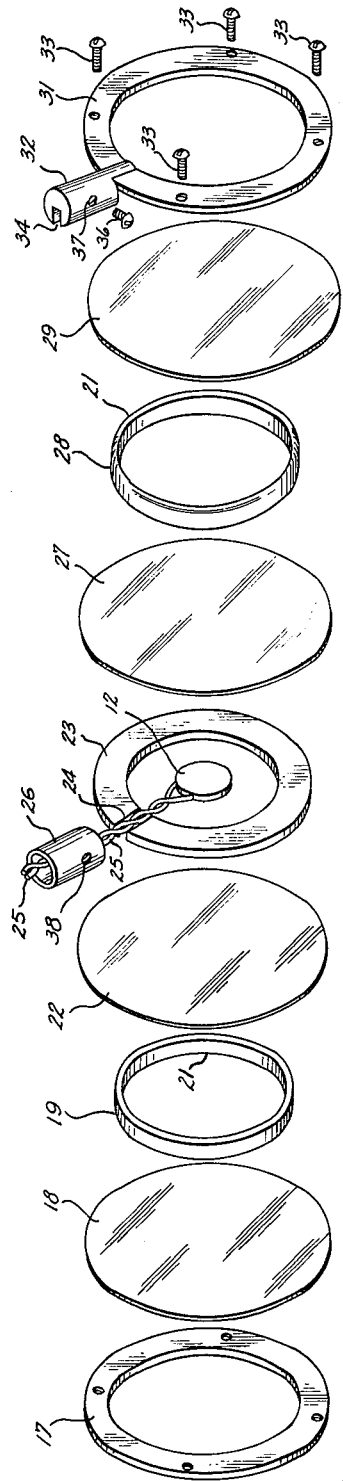
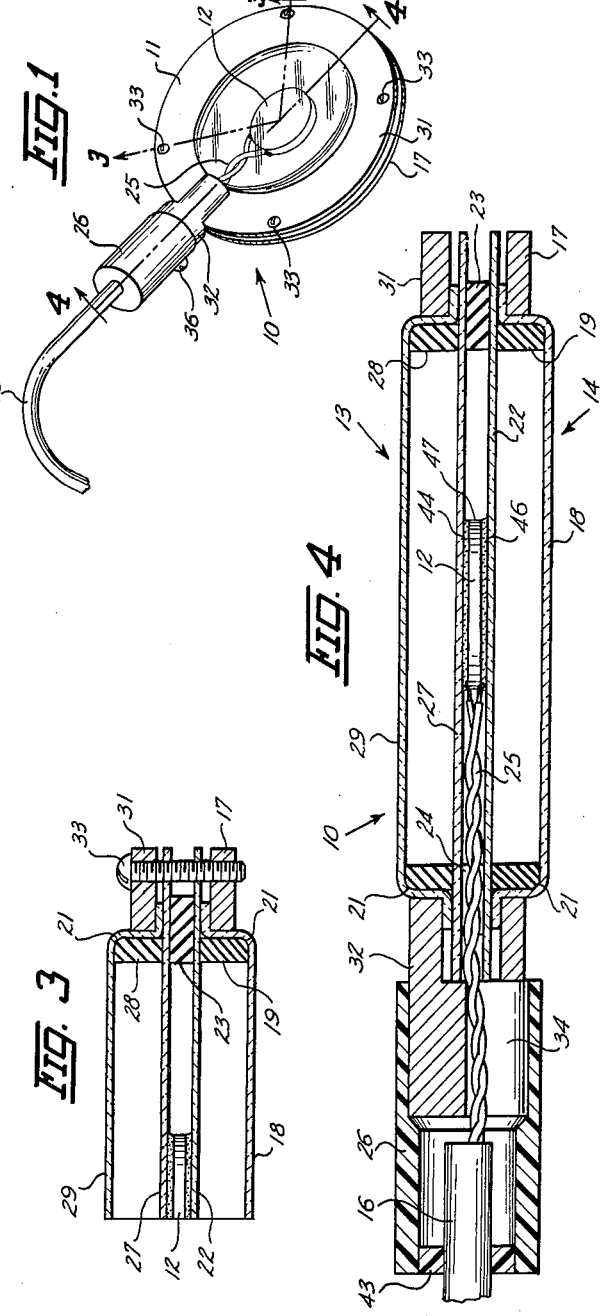
INVENTOR.
LEO J. FRITSCHEN
BY
Lowell & Henderson
ATTORNEYS.

United States Patent Office 3,054,841
Patented Sept. 18, 1962

3,054,841
SHIELDED NET RADIOMETER
Leo J. Fritschen, Ames, Iowa, assignor to Iowa State College Research Foundation, Ames, Iowa, an association of Iowa
Filed Nov. 2, 1959, Ser. No. 850,297
1 Claim. (Cl. 136—4)

This invention relates to electrical measuring devices utilizing a thermocouple assembly and particularly to a device for measuring net radiation directly.

For the purpose of determining evaporation, transpiration, and heat budget of the earth, various methods have been used to estimate both solar, terrestrial and net radiation. These methods have been embodied, however, in apparatus of a cumbersome and expensive nature, not conducive to the replication of measurement of radiation on various treatments within an experiment, for example, where the ground cover, surface and color varies. To accomplish this, a small inexpensive all-weather instrument is needed for measuring net radiation and wherein the measurement has a degree of accuracy the equivalent of presently known net radiometers.

It is therefore, an object of this invention to provide an improved net radiometer.

It is another object of this invention to provide a small inexpensive all-weather instrument utilizing an economical thermal transducer for measuring net radiation.

Another object of this invention is to provide a net radiometer shielded from the effects of wind and precipitation which is sensitive to the wave lengths of solar radiation and of terrestrial radiation, which is not sensitive to ambient temperature, and the output of which can be recorded with any sensitive potentiometer.

These objects and other features and advantages of this invention will become readily apparent upon reference to the following description when taken in conjunction with the accompanying drawings, wherein:

FIG. 1 is a full scale perspective view of a net radiometer embodying the present invention;

FIG. 2 is an exploded perspective view of various parts of the net radiometer;

FIG. 3 is an enlarged detail sectional view taken along the line 3—3 in FIG. 1; and FIG. 4 is an enlarged cross sectional view of the net radiometer taken along the line 4—4 in FIG. 1.

In a preferred embodiment of the invention, the net radiometer, indicated generally at 10 in FIG. 1, comprises a capped fluid tight cylinder 11 having a heat-flow or thermal transducer 12 centered therein between two pairs of radiation windows 13 and 14 (FIG. 4) and having a lead wire 16 for connection to a recording instrument (not shown). The cylinder 11 includes a center ring member 23 (FIG. 4) within which the transducer 12 is centered, two pairs of radiation windows 13 and 14 comprised respectively of planar sheets 18, 22 and 27, 29 mounted in spaced relation on each side of the transducer 12, and a pair of brass rings 17 and 31 for clamping the aforementioned parts together in an assembled relation best illustrated in FIG. 4. A lead wire 25 for the transducer extends outwardly of the cylinder 11 for electrical connection purposes described hereinafter.

More specifically, and referring to FIG. 2, the net radiometer 10 includes the following parts as viewed from left to right; a brass ring 17 approximately $\frac{1}{16}''$ thick, having an outer diameter of $1\frac{15}{16}''$ and an inner diameter of $1\frac{1}{2}''$; a circular planar sheet 18 of material marketed under the trademark "Saran Wrap" and having a diameter of $1\frac{15}{16}''$; a tubular insulating frame 19 of rubberized fiber with the outer edge 21 rounded (FIG. 4) and being $\frac{1}{8}''$ thick, and with an outer diameter of $1\frac{7}{16}''$ and an inner diameter of $1\frac{5}{16}''$; another sheet 22 of Saran Wrap; a tubular insulating center member 23 of rubberized fiber with a split or slot 24 formed therein, and having a thickness of $\frac{1}{16}''$, an outer diameter of $1\frac{11}{16}''$ and an inner diameter of $1\frac{5}{16}''$; the thermal transducer 12 with lead wire 25 and a Bakelite or insulating material support 26 therefor; another sheet 27 of Saran Wrap, another tubular insulating frame 28 identical to member 19, another sheet 29 of Saran Wrap; and another brass ring 31 having the same dimensions as the ring 17 and with a slotted brass rod 32 affixed thereto.

Of note, the dimensions of the rings 19 and 28 should be such that the radial distance from the outer periphery of the transducer 12 to the inner diameter of each ring is larger than the thickness of each ring by at least a 10 to 1 ratio. This minimizes the shadow effect of the rings on the transducer at low sun angles.

In the assembly of the net radiometer 10, the inner Saran Wrap sheets 22 and 27 (FIG. 4) are placed on the lower and upper sides respectively of the center insulating member 23, with the thermal transducer 12 centered within the member 23 so as to be substantially concentric therewith and spot bonded on both sides with black adhesive (not shown) or the equivalent to the sheets 22 and 27 to prevent the transducer from being jarred out of position. Both surfaces of the transducer 12 are painted with an optical flat black paint to increase absorption of radiation. The two insulating frames 19 and 28 are then located on both sides of the assembled center member 23 and sheets 22 and 27, and the remaining Saran Wrap sheets 18 and 29 are placed over the rounded edges 21 of the frames 19 and 28. The rings 17 and 31 are then placed over the frames 19 and 28 and secured together by means of screws 33 inserted through aligned holes formed in the frames.

Care should be taken that the Saran Wrap sheets are all stretched tight and that the transducer 12 is level and centered relative to the center member 23 before the screws 33 are set. The transducer lead wire 25, extending through the slot 24 (FIG. 2) in the center member 23, is placed in another slot 34 (FIG. 4) formed in the brass rod 32 and is threaded through the Bakelite support 26. The support is then placed about the brass rod 32 and secured thereto by a brass screw 36 (FIG. 1) alignable holes 37 and 38 being provided therefor in the rod 32 and support 26. A more durable copper lead wire 16 is attached to the transducer lead wire 25, the connected ends of which are pushed inside the support 26, the support then being sealed by any conventional means 43.

The frames 19 and 28 and the center member 23 are all specified as composed of rubberized fiber as that material has a low coefficient of expansion and is an insulating material.

The use of Saran Wrap for forming the radiation windows 13 and 14 was chosen as preferable over mica and polyethylene, treated an untreated. Mica, although being waterproof and having a high and satisfactory transmission characteristic over the wave lengths of solar radiation of 0.1 to 7.0 microns, was found to have strong absorption bands between the wave lengths of 8.8 and 10.3 microns in the terrestrial radiation range of 4.0 to 60.0 microns, indicating possible values of net radiation which would cause those values to be too large.

Untreatd polyethylene was found to have a rather high and uniform percent transmission, with some strong absorption bands occurring in the wave lengths of terrestrial radiation, but has the serious defect of not being waterproof thus preventing the net radiometer from being a true all-weather instrument. Polyethylene treated with silicone for waterproofing purposes greatly reduces the transmission percentage while introducing additional undesirable absorption bands in the terrestrial radiation wave lengths of 9 to 10, and 12 to 13 microns.

Saran Wrap, which is waterproof, was found to have generally as high a transmission value in the solar radiation wave lengths as mica, and as having a higher value in the terrestrial radiation wave lengths than mica and silicone treated polyethylene, with only one low transmission percentage at a wave length of from 9+ to 10− microns. The Saran Wrap sheets are arranged in spaced pairs on each side of the transducer to provide a dead air space on each side thereof for eliminating the effects of wind currents therein.

The thermal transducer 12 is of a commercial manufacture, the particular one disclosed herein being manufactured by the National Instruments Laboratories, Inc., Catalogue No. HF–1–C, manufactured under British Patent No. 587,996. The transducer 12 (FIG. 4) is a thin circular disc having faces 44 and 46 of electrically conductive material separated by a material 47 having predetermined thermal and electrical resistances. More specifically, the material 47 is comprised of the element tellurium of commercial purity, with the faces 44 and 46 each bearing a coating of copper or some other metal such as silver which has a low thermoelectric force against copper. The faces 44 and 46 are connected each by a fine wire (not shown) which make up the two strands of the lead wire 25. In another form of the thermal transducer 12, the material 47 is of electrically insulating material, coated on the two sides or faces 44 and 46 with material having a high temperature coefficient of resistance. Materials of the class known as semi-conductors having very high co-efficients, such as four percent per degree centigrade can be used. One of these is obtainable as a coating, supplied with leads, upon very thin sheet nickel, from which it is insulated by a layer of vitreous non-conductor. The difference of temperature may be measured by a differential arrangement, several types of which are well known.

The net radiometer 10 is calibrated in a manner well known to those in the art by means utilizing an Eppley pyrheliometer as a standard. Both sides of the net radiometer 10 are calibrated to determine the top and bottom effects.

In use, the surfaces or faces 44 and 46 of the transducer 12 should be leveled so that they are perpendicular to the forces of gravity. This may be accomplished by using a small hand level to level the net radiometer 10 in both X, east and west, and Y, north and south directions.

In summary, a miniature net radiometer is provided which may be used by itself with any sensitive potentiometers or which may be connected with other net radiometers by a switching mechanism to the potentiometer, for receiving on one side incoming radiation consisting of solar and sky (long wave) radiation and on the other side long wave terrestrial radiation and reflected (both long and short waves) radiation. These wave lengths after being transmitted through radiation windows provided for shielding the transducer from the effects of wind, precipitation, condensation, etc., strike the respective sides of the thermal transducer for generating an E.M.F. from the measurement of which the differential or net radiation value is obtained. The term "transmitted" is defined as admitting the passage of radiation wave lengths, or in other words, the Saran Wrap sheets are transparent to the wave lengths mentioned. As referred to hereinbefore, the "long" wave lengths from the sky and earth's radiation generally fall between 4.0 to 60.0 microns, while the majority of "short" wave lengths from the solar radiation falls between 0.1 to 7.0 microns.

Although a preferred embodiment has been disclosed herein, it is to be remembered that various equivalent materials may be used and that alterations may be made to the embodiment within the full scope of the invention as defined in the appended claim.

I claim:

A net radiometer comprising a flat, ring-like member of insulating material, a pair of windows having a diameter substantially equal to that of said ring-like member mounted on either side of said member and held in spaced, parallel relationship thereby, each said window being formed from two, separate elements secured in parallel, spaced relationship, said separate elements having the characteristics of transmitting and being transparent to both long and short terrestrial and solar radiation wavelengths, means for clamping said elements to said ring-like member, whereby said ring-like member and spaced windows are caused to form a watertight housing, and a thin, flat, thermal transducer having separate, oppositely disposed faces of thermal conductive material concentrically mounted within said housing so that each of said oppositely disposed faces is heated by radiation passing through one of said windows, said oppositely disposed faces forming two, opposed, interconnected thermocouples, whereby said thermal transducer is caused to generate an electromotive force indicative of the difference in temperature between said oppositely disposed faces.

References Cited in the file of this patent

UNITED STATES PATENTS

| | | |
|---|---|---|
| 2,083,317 | Dallenbach | June 8, 1937 |
| 2,295,990 | Fridgen | Sept. 15, 1942 |
| 2,296,670 | Hewlett | Sept. 22, 1942 |
| 2,382,220 | Fogle | Aug. 14, 1945 |
| 2,406,139 | Fink et al. | Aug. 20 1946 |
| 2,444,027 | Becker et al. | June 29, 1948 |
| 2,562,770 | Carter | July 31, 1951 |
| 2,779,811 | Picciano et al. | Jan. 29, 1957 |

FOREIGN PATENTS

| | | |
|---|---|---|
| 539,420 | France | Apr. 1, 1922 |
| 587,996 | Great Britain | May 12, 1947 |